(12) United States Patent
Dumas et al.

(10) Patent No.: US 12,081,107 B2
(45) Date of Patent: Sep. 3, 2024

(54) DEVICE FOR COOLING AN ELECTRIC MACHINE AND THE ELECTRIC MACHINE COMPRISING SUCH A DEVICE

(71) Applicant: RENAULT s.a.s., Boulogne-Billancourt (FR)

(72) Inventors: Eric Dumas, Houilles (FR); Francois Paris, Amfreville la mivoie (FR)

(73) Assignee: AMPERE s.a.s., Boulogne-Billancourt (FR)

(*) Notice: Subject to any disclaimer, the term of this patent is extended or adjusted under 35 U.S.C. 154(b) by 872 days.

(21) Appl. No.: 17/048,836

(22) PCT Filed: Apr. 9, 2019

(86) PCT No.: PCT/EP2019/058923
§ 371 (c)(1),
(2) Date: Oct. 19, 2020

(87) PCT Pub. No.: WO2019/201667
PCT Pub. Date: Oct. 24, 2019

(65) Prior Publication Data
US 2021/0159761 A1    May 27, 2021

(30) Foreign Application Priority Data
Apr. 20, 2018 (FR) .................... 1853522

(51) Int. Cl.
*H02K 9/19* (2006.01)
*H02K 5/20* (2006.01)
*H02K 9/197* (2006.01)

(52) U.S. Cl.
CPC ............. *H02K 9/197* (2013.01); *H02K 5/203* (2021.01); *H02K 9/19* (2013.01)

(58) Field of Classification Search
CPC .......... H02K 9/197; H02K 5/203; H02K 9/19
USPC ........................................... 310/54
See application file for complete search history.

(56) References Cited

U.S. PATENT DOCUMENTS

| 6,065,297 A | 5/2000 | Tischer et al. | |
|---|---|---|---|
| 2013/0033145 A1* | 2/2013 | Randolph | H02K 3/38 310/215 |
| 2013/0056181 A1 | 3/2013 | Baerd et al. | |

(Continued)

FOREIGN PATENT DOCUMENTS

| CA | 2116900 A1 | 9/1995 |
|---|---|---|
| EP | 2 533 621 A1 | 12/2012 |

(Continued)

OTHER PUBLICATIONS

International Search Report issued on Jun. 5, 2019 in PCT/EP2019/058923 filed on Apr. 9, 2019, 2 pages.

(Continued)

*Primary Examiner* — Thomas Truong
(74) *Attorney, Agent, or Firm* — Oblon, McClelland, Maier & Neustadt, L.L.P.

(57) ABSTRACT

A cooling device for cooling an electric machine of a motor vehicle includes a reservoir and a circuit fluidically connected to the reservoir. The reservoir is intended to be situated radially between a housing of the electric machine and a stator of the electric machine, with respect to an axis of the electric machine.

8 Claims, 2 Drawing Sheets

(56) References Cited

U.S. PATENT DOCUMENTS

2015/0381001 A1* 12/2015 Tsuiki ................. H02K 3/28
                                                  310/208
2016/0105083 A1*  4/2016 Ishimaru ............. H02K 5/22
                                                   310/54
2021/0159761 A1*  5/2021 Dumas ................ H02K 9/19

FOREIGN PATENT DOCUMENTS

FR        2 260 890 A1    9/1975
WO    WO 2017/142457 A1   8/2017

OTHER PUBLICATIONS

French Preliminary Search Report and Written Opinion (with translation of categories) issued on Dec. 18, 2018 in French Application 1853522 filed on Apr. 20, 2018, 8 pages.

* cited by examiner

DEVICE FOR COOLING AN ELECTRIC MACHINE AND THE ELECTRIC MACHINE COMPRISING SUCH A DEVICE

BACKGROUND

The present invention relates to the field of electric machine cooling devices, and more particularly electric machines intended to equip terrestrial, marine or air transport means.

The motor vehicles with electric or electric hybrid propulsion conventionally comprise a power train equipped with an electric machine. The electric machine is generally cooled by a cooling device comprising a circuit and a tank, also called sump. The tank is situated under the electric machine. The circuit is supplied with fluid by the tank and comprises portions thermally connected with the stator and/or the rotor of the electric machine.

Such an arrangement allows for the cooling of the electric machine but does not give full satisfaction. On the one hand, the cooling device takes up a significant amount of space in the limited space of the engine compartment. Also, if the vehicle tilts strongly or there is a strong roadway banking, a depriming of a hydraulic fluid circulation pump may occur, interrupting the cooling of the electric machine.

BRIEF SUMMARY

In light of the above, the aim of the invention is to allow for the cooling of an electric machine while mitigating the abovementioned drawbacks.

More particularly, the aim of the invention is to increase the compactness of the cooling device while limiting its sensitivity to an inclination of the vehicle or to a banking of the roadway.

To this end, a cooling device for an electric machine of a motor vehicle is proposed comprising a tank and a circuit fluidically connected with the tank.

According to a general feature of this device, the tank is intended to be radially situated between a housing of the electric machine and a stator of the electric machine relative to an axis of the electric machine, and over all the circumference around the axis of the electric machine.

Such a disposition of the tank makes it possible to increase the compactness of the cooling device by limiting, notably, a vertical offset between the axis of the electric machine and a bottom part of the tank and by using a space situated above and to the side of the stator for the tank. Furthermore, the hydraulic fluid contained at high pressure in the tank contributes to the cooling of the stator of the electric machine.

In one embodiment, the circuit comprises a first peripheral compartment axially offset relative to the tank.

By limiting the vertical offset between the axis of the electric machine and a bottom part of the tank and by thus compartmentalizing the cooling device, a dispersion of the fluid in case of inclination of the device is limited. That done, the sensitivity of the cooling device to strong inclinations of the vehicle or to strong bankings of the roadway is thereby limited.

It is also possible to provide a first annular sealing means at right angles to the axis of the electric machine, the first sealing means being axially inserted between the tank and the first peripheral compartment.

In one embodiment, the circuit comprises a channel fluidically connected with the tank and a spraying means connected to the channel emerging in the first peripheral compartment, the spraying means being intended to be disposed axially facing a winding of the rotor of the electric machine.

The disposition of the tank between the housing and the stator makes it possible to cool the stator and therefore does away with the need for a spraying means arranged to cool the stator. By axially disposing the spraying means facing a rotor winding, the rotor is cooled more efficiently while improving the compactness and while reducing the cost of production of the device.

Advantageously, the circuit comprises a second peripheral compartment, the tank being axially inserted between the first peripheral compartment and the second peripheral compartment, the device comprising a second annular sealing means at right angles to the axis of the electric machine, the second sealing means being axially inserted between the tank and the second peripheral compartment.

Various constructions can be envisaged for the circuit downstream of the peripheral compartments and upstream of the tank. Among these constructions, it is notably possible to envisage the following variants, given as nonlimiting examples.

According to a first variant, the circuit comprises a pump, an output duct and an injection duct connecting the pump with the tank, the output duct comprising a first upstream portion fluidically connected with the first peripheral compartment, a second upstream portion fluidically connected with the second peripheral compartment and a downstream portion connecting the first upstream portion, the second upstream portion and the pump.

This first variant makes it possible to improve in particular the compactness of the device through the use of a single pump.

According to a second variant, the circuit comprises a first pump, a first output duct fluidically connected with the first peripheral compartment, a second pump, a second output duct fluidically connected with the second peripheral compartment and an injection duct comprising a first upstream portion, a second upstream portion and a downstream portion connecting the first upstream portion, the second upstream portion and the tank, the first pump connecting the first output duct with the first upstream portion, the second pump connecting the second output duct with the second upstream portion.

This second variant makes it possible to minimize the risk of depriming of the pumps. This variant is therefore more particularly suited to demanding applications, such as for electric traction machines of an all-terrain vehicle or electric machines embedded in aircraft.

In one embodiment, the circuit comprises a non-return valve disposed on an output duct.

The risk of depriming a pump upon a strong inclination of the vehicle is thereby limited.

In another embodiment, the circuit comprises an equalizing duct fluidically connected with the first peripheral compartment and with the second peripheral compartment, the equalizing duct comprising a nozzle and a ball disposed in the nozzle.

The equalizing duct makes it possible, in case of the occurrence of an imbalance in the levels of hydraulic fluid in the peripheral compartments, for example following a strong inclination, to reestablish the balance between the hydraulic fluid levels.

In one embodiment, the device comprises a means for managing the temperature of a hydraulic fluid contained in the tank, the management means being capable of driving a supply of the stator of the electric machine.

Such a management means makes it possible to control the temperature of the hydraulic fluid without having to incorporate a fluid heating means so as to simply optimize the cooling implemented by the device.

According to another aspect, there is proposed an electric machine for a motor vehicle, preferably for an electric or hybrid propulsion electric vehicle power train, comprising a housing, a stator and a device as defined previously.

Other aims, features and advantages of the invention will become apparent on reading the following description, given purely as a nonlimiting example, and with reference to the attached drawings in which:

DETAILED DESCRIPTION

Figure 1:
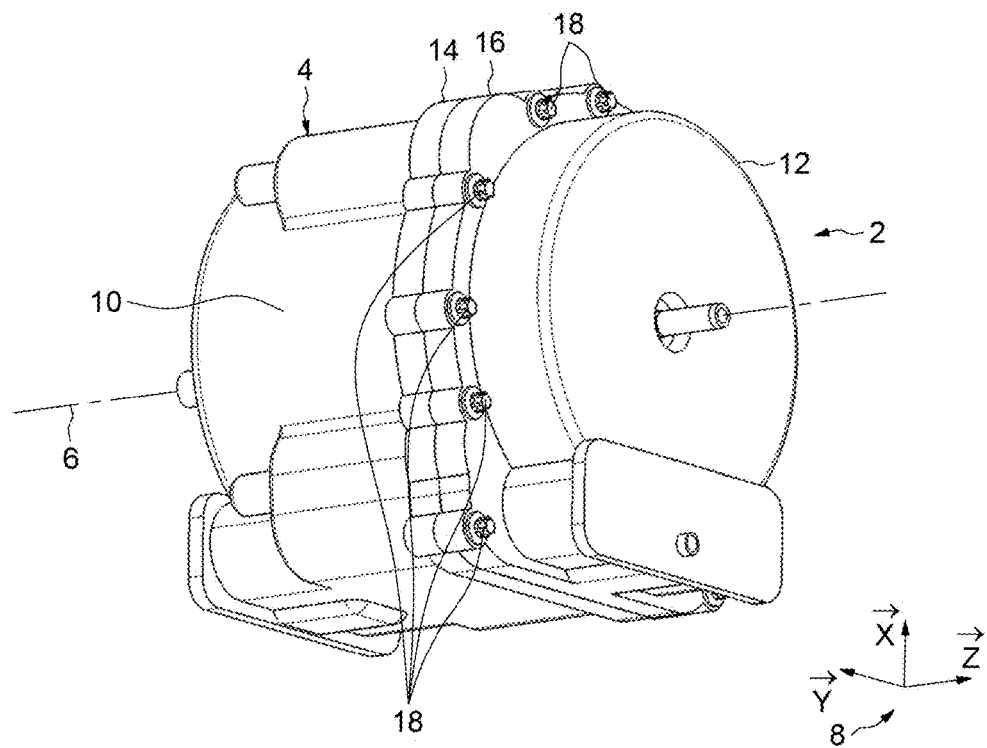
FIG. 1 is a perspective view of an electric machine according to one aspect of the invention.
Figure 2:
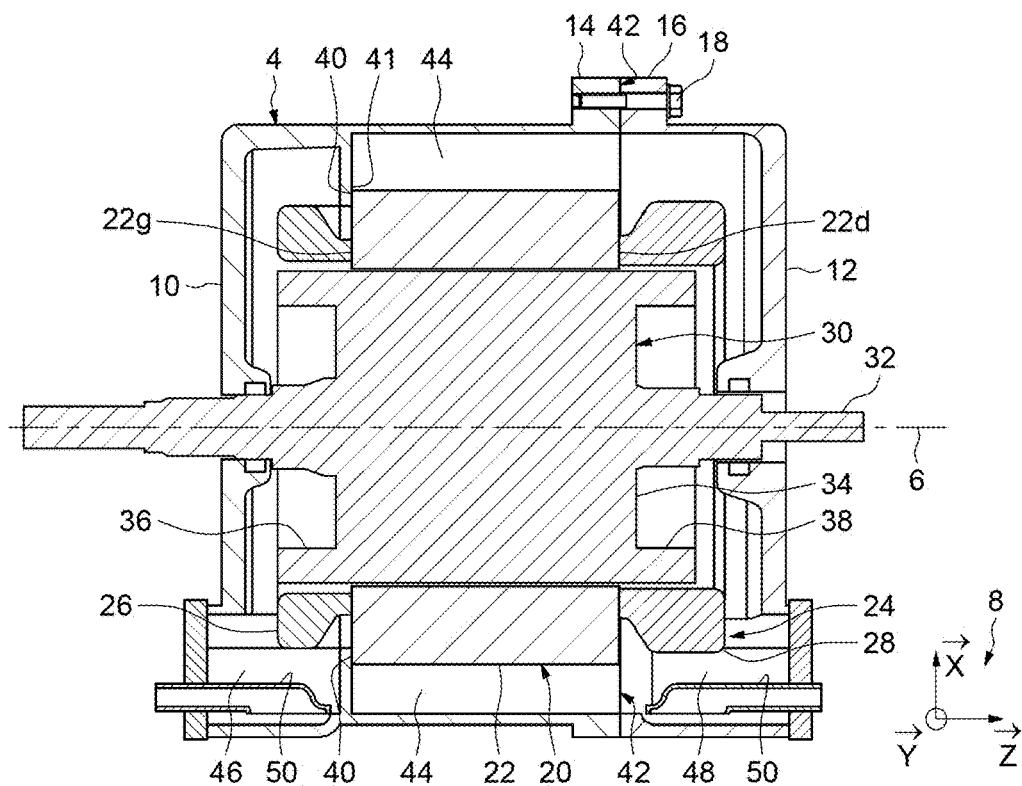
FIG. 2 is a longitudinal cross-sectional view of the electric machine of FIG. 1, FIG. 3 schematically represents a cooling device according to an embodiment of the invention, and FIG. 4 schematically represents a cooling device according to another embodiment of the invention.

Referring to FIGS. 1 and 2, an electric machine 2 has been schematically represented. In the example illustrated, the electric machine 2 is intended to be incorporated in a power train of a motor vehicle (not represented) with an electric or hybrid electric propulsion. However, there is of course no departure from the context of the invention if the electric machine 2 is incorporated in another device, for example an air transport means such as an aircraft.

The electric machine 2 notably comprises a housing 4 that is axisymmetrical about an axis of symmetry 6. A direct orthonormal vector base 8 is defined that is attached to the housing 4. The base 8 is composed of a vector $\vec{X}$, a vector $\vec{y}$ and a vector $\vec{Z}$. The vector $\vec{Z}$ is parallel to the axis 6.

In the present application, unless indicated otherwise, the terms "axial", "axially", "radial", "radially" and "circumference" will be understood to relate to the axis 6. Moreover, the term "cylindrical" will be understood according to its conventional definition, namely that a cylindrical surface is a surface composed of the straight lines of given direction which pass through a given curve.

The housing 4 comprises a first housing portion 10 and a second housing portion 12. An outer radial flange 14 extends at one axial end of the housing 10. An outer radial flange 16, of a form corresponding to the form of the flange 14, extends at an axial end of the portion 12. The portions 10 and 12 are in axial contact with one another notably by the flanges 14 and 16. The portions 10 and 12 are fixed by a plurality of threaded rods 18. In this particular case, eleven threaded rods 18 fix the portions 10 and 12.

The electric machine 2 comprises a stator 20 disposed inside the housing 4. The stator 20 is cylindrical about the direction of the vector $\vec{Z}$. The stator 20 notably comprises a body 22 and a winding 24. The body 22 is cylindrical with circular axial section about the axis 6. As represented in FIG. 2, the winding 24 notably comprises a left lead-out wire 26 and a right lead-out wire 28 situated axially on either side of the stator body 22. The stator body 22 and the lead-out wire 26 are received inside the portion 10. The lead-out wire 28 extends axially out of the portion 10 and is received inside the portion 12.

The electric machine 2 comprises a rotor 30. The rotor 30 is cylindrical about the direction of the vector. The rotor 30 comprises a shaft 32 and a body 34. The shaft 32 is mounted to rotate about the axis 6 relative to the housing 4. The body 34 is radially delimited by an outer cylindrical surface (not referenced) with circular axial section about the axis 6. The body 34 receives a winding notably comprising a left lead-out wire 36 and a right lead-out wire 38.

The electric machine 2 comprises a silicone bead 40. The bead 40 is placed on an axial front-end surface 41 of the portion 10. The surface 41 is in axial contact via the bead 40 with an axial front-end surface 22g of the body 22. The bead 40 forms a continuous loop over the circumference of the surface 41. More specifically, the bead 40 forms a ring in the plane at right angles to the vector $\vec{Z}$. In the example illustrated, the ring formed by the bead 41 is primarily circular with four local radial widenings.

The electric machine 2 comprises an annular seal 42. The seal 42 is substantially flat. The seal 42 is axially inserted between the flanges 14 and 16. The seal 42 comprises an inner radial end (not referenced) in axial contact with an axial front-end surface 22d of the body 22. In the example illustrated, the seal 42 is composed of a metal washer. However, it is possible to envisage, without departing from the scope of the invention, a seal 42 composed of a washer made of another material, for example rubber, or of two washers made of two different materials juxtaposed relative to one another, for example a metal washer juxtaposed with a rubber washer.

The bead 40 and the seal 42 thus form sealing means axially situated on either side of the body 22. By virtue of these sealing means, the interior of the housing 4 is compartmented between a tank 44, a first peripheral compartment 46 and a second peripheral compartment 48. The tank 44 is axially inserted between the compartments 46 and 48. The tank 44 extends over all the circumference about the axis 6, in other words, the tank 44 fully surrounds the axis 6 and the stator 20. The tank 44 is tightly delimited relative to the compartment 46 by the bead 40. Likewise, the tank 44 is tightly separated from the compartment 48 by the seal 42. Obviously, it is possible, without departing from the scope of the invention, to invert the sealing means 40 and 42, that is to say use a seal in place of the bead 40 and/or use a bead of silicone instead of the seal 42.

The compartments 46 and 48 each comprise a strainer 50 in their bottom portion. The strainers 50 are capable of collecting a hydraulic fluid contained in the compartments 46 and 48. More specifically, the strainers 50 are in contact with a sheet of hydraulic fluid formed in the bottom of the compartments 46 and 48 and can, thereby, collect hydraulic fluid from these sheets.

Figure 3:
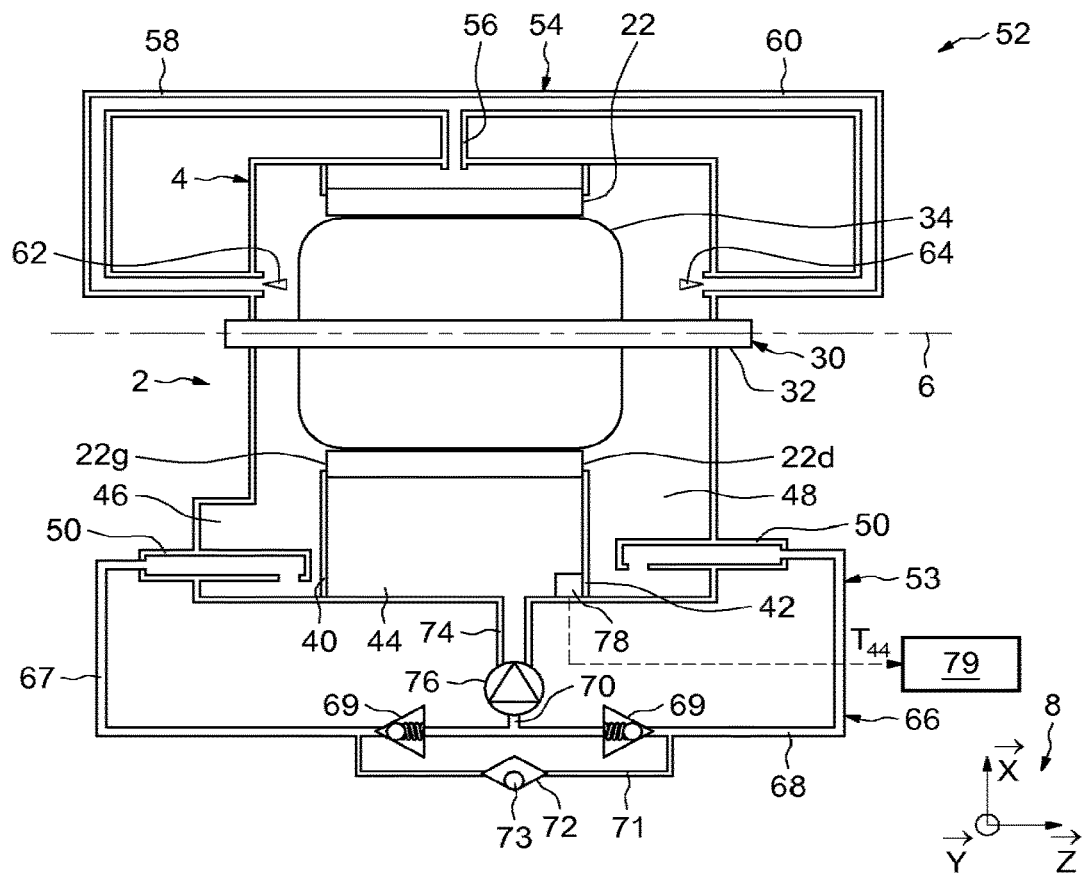

Referring to FIG. 3, the electric machine 2 comprises a cooling device 52. In the interests of clarity of the figures, the electric machine 2 has been represented schematically in FIG. 3, certain elements of the electric machine 2 having deliberately been omitted. Likewise, the device 52 has been omitted in FIGS. 1 and 2 to improve the clarity of these figures. The device 52 notably comprises the tank 44 and a circuit 53 which notably comprises the compartments 46 and 48 respectively delimited tightly by the sealing means 40 and 42. The tank 44 and the circuit 53 exchange a hydraulic fluid that can notably comprise oil.

The circuit 53 comprises a high-pressure channel 54, the function of which is to distribute the hydraulic fluid contained in the tank 44 to the peripheral compartments 46 and 48. The channel 54 comprises an upstream portion 56 fluidically connected with the tank 44. The channel 54 comprises a first downstream portion 58 and a second downstream portion 60. The portions 58 and 60 are fluidically connected with the portion 56. Each portion 58, 60 respectively comprises a spray nozzle 62, 64. The spray nozzle 62 emerges in the compartment 46. The spray nozzle 64 emerges in the compartment 48. More specifically, each spray nozzle 62, 64 is respectively axially disposed facing the lead-out wire 36, 38. Although the spray nozzles are used to spray the hydraulic fluid, it is of course possible to use another dispersion means or another spraying means.

The circuit 53 comprises an output duct 66. The duct 66 comprises a first upstream portion 67 fluidically connected with the strainer 50 of the compartment 46 and a second upstream portion 68 connected with the strainer 50 of the compartment 48. Each portion 67, 68 comprises a non-return valve 69 blocking the flow to the associated strainer 50. The duct 66 comprises a downstream portion 70 fluidically connected with the portions 67 and 68.

The circuit 53 comprises an equalizing duct 71 linking the portions 67 and 68. More specifically, the point of connection of the duct 71 to each portion 67, 68 is upstream of the associated non-return valve 69. The duct 71 comprises a nozzle 72 with an equalizing ball 73. That way, the duct 71 is blocked by the ball 73 if the vehicle is inclined. If the vehicle is level, the ball 73 is displaced to the middle of the nozzle 72 and hydraulic fluid can flow in the duct 71 to reestablish a balance between the hydraulic fluid level in the compartment 46 and the hydraulic fluid level in the compartment 48. Although, in the example illustrated, a nozzle and a ball are used to produce the equalizing duct 71, it is of course possible to envisage any other means for producing the opening and the closing of the fluid flow in the duct 71 based on an inclination of the vehicle.

The circuit 53 comprises a high-pressure injection duct 74. The duct 74 is fluidically connected with the tank 44. The circuit 53 further comprises a pump 76 connecting the portion 70 with the duct 74.

The device 52 comprises a temperature sensor 78 inside the tank 44. By virtue of the sensor 78, the temperature $T_{44}$ of the hydraulic fluid contained in the tank 44 can be measured. It is however possible to envisage using other means to determine the temperature $T_{44}$, for example an estimator based on a mapping.

The device 52 comprises a driver module 79 informationally linked with the sensor 78 and a control device (not represented) of the electric machine 2. The module 79 is provided with hardware and software means for establishing a stator supply current setpoint 20. In fact, the module 79 is configured to follow a supply current setpoint when the temperature $T_{44}$ is below a threshold value $T_{44\_low\_threshold}$, and to reduce the supply current of the stator 20 when the temperature $T_{44}$ is above a threshold value $T_{44\_high\_threshold}$. A means for managing the temperature $T_{44}$ is thus provided.

By virtue of this arrangement, the pump 76 generates a flow in the tank 44. The hydraulic fluid contained at high pressure in the tank 44 cools the stator 20 of the electric machine 2. It is thereby possible to drive the temperature $T_{44}$ by modifying the supply current of the stator 20 by means of the driver module 79. The high-pressure hydraulic fluid is directed by the channel 54 to the spray nozzles 62 and 64. The spray nozzle 62 sprays the hydraulic fluid into the compartment 46 to cool the rotor 30 at the lead-out wire 36. Likewise, the spray nozzle 64 sprays the hydraulic fluid against the lead-out wire 38 in the compartment 48. The sprayed hydraulic fluid then builds up in the bottom of the compartments 46 and 48 so as to form a sheet in the vicinity of the strainers 50. The pump 76 sucks the hydraulic fluid which is then re-introduced under pressure into the tank 44.

Figure 4:
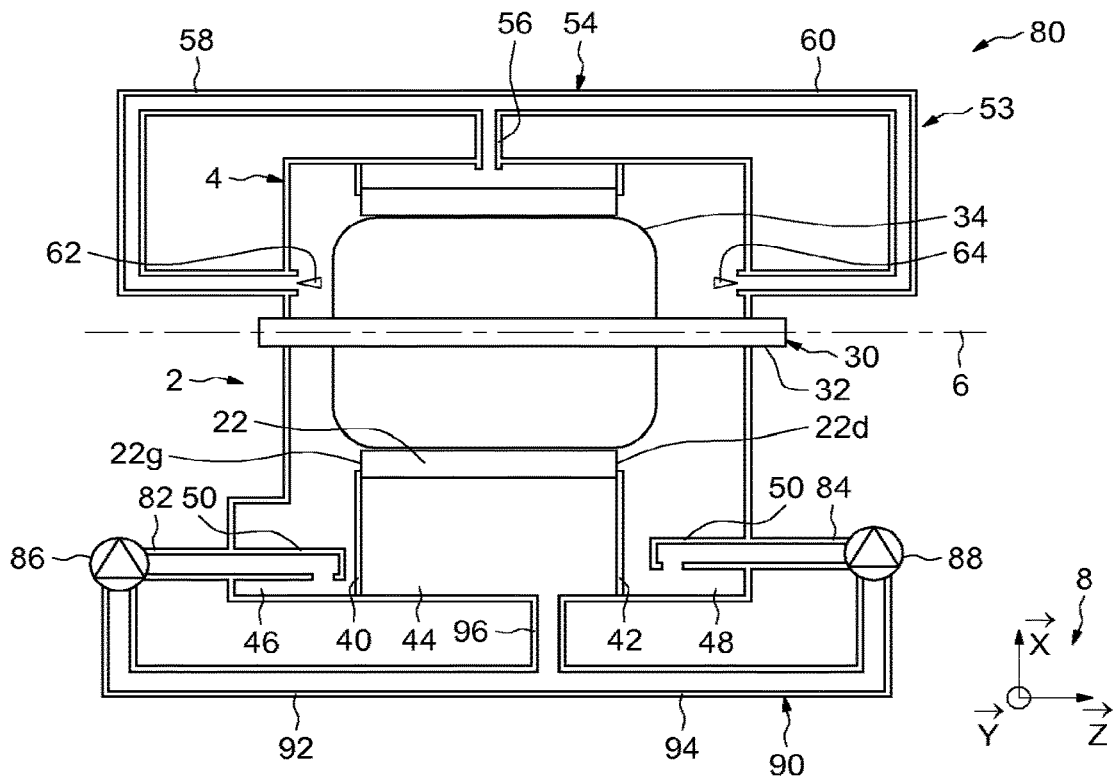

Referring to FIG. 4, another embodiment of the cooling device 80, intended to be incorporated in the electric machine 2, has been schematically represented. The elements that are identical bear the same references.

The cooling device 80 according to the embodiment of FIG. 4 differs from the device 52 in that it comprises a first output duct 82 and a second output duct 84 instead of the duct 66. The duct 82 is connected to the strainer 50 of the compartment 46. The duct 84 is connected to the strainer 50 of the compartment 48. The device 80 comprises a first pump 86 and a second pump 88 mounted respectively on the duct 82 and the duct 84.

The device 80 comprises an injection duct 90. The duct 90 comprises a first upstream portion 92 connected to the pump 86 and a second upstream portion 94 connected to the pump 88. The duct 90 comprises a downstream portion 96 fluidically connected with the tank 44 and the portions 92 and 94.

By this arrangement, the pumps 86 and 88 generate a flow of hydraulic fluid at high pressure in the tank 44. This fluid is directed by the channel 54 into the compartments 46 and 48. That way, the hydraulic fluid cools the stator 20 and the rotor 30 as in the embodiment of FIG. 3. Next, the fluid contained in the compartment 46 is collected by the strainer 50 associated with the duct 82 by suction by the pump 86. Likewise, the fluid contained in the compartment 48 is sucked by the pump 88 via the duct 84 and the associated strainer 50. The fluid sucked by the pump 86 on the one hand, and by the pump 88 on the other hand, respectively follow the portions 92 and 94 to rejoin the tank 44 via the portion 96.

This embodiment therefore makes it possible to implement the same cooling as the embodiment of FIG. 3 by limiting to the maximum the risk of depriming of a hydraulic fluid circulation pump. The device 80 is therefore particularly suited to electric machines intended for particularly demanding applications, such as electric machines intended to be incorporated in the power train of all-terrain vehicles or in an aircraft.

In the example illustrated, the device 80 has no non-return valve or equalizing duct. It is however possible, to limit to the maximum the risk of depriming of a pump and the risk of imbalance of the hydraulic fluid levels, to add non-return valves on the ducts 82 and 84 and/or an equalizing duct connecting the ducts 82 and 84. Likewise, the driver module 79 and the sensor 78 can of course be incorporated in the device 80 without departing from the scope of the invention.

In light of the above, the electric machine 2 and the cooling devices 52 and 80 make it possible, by radially inserting the tank 44 between the housing 4 and the stator 20, to effectively cool the electric machine while increasing the compactness and while limiting the risk of failure of the cooling in case of strong inclination of the vehicle or strong banking of the roadway.

The invention claimed is:

1. An electric machine of a motor vehicle, comprising:
   a cooling device, said device comprising a tank and a circuit fluidically connected with the tank, wherein the tank is situated radially between a housing of the electric machine and a stator of the electric machine relative to an axis of the electric machine and over all the circumference around the axis of the electric machine, the circuit comprising a first peripheral compartment axially offset relative to the tank, the device comprising a first annular sealing means at right angles to the axis of the electric machine, the first sealing means being axially inserted between the tank and the first peripheral compartment, wherein the circuit comprises a second peripheral compartment, the tank being axially inserted between the first peripheral compartment and the second peripheral compartment, the device comprising a second annular sealing means at right angles to the axis of the electric machine, the second sealing means being axially inserted between the tank and the second peripheral compartment, the circuit comprising a pump, an output duct and an injection duct connecting the pump with the tank, the output duct comprising a first upstream portion fluidically connected with the first peripheral compartment, a second upstream portion fluidically connected with the second peripheral compartment and a downstream portion connecting the first upstream portion, the second upstream portion and the pump.

2. The electric machine as claimed in claim 1, wherein the circuit comprises a channel fluidically connected with the tank and a spraying means connected to the channel and emerging in the first peripheral compartment, the spraying means being disposed axially facing a winding of the rotor of the electric machine.

3. The electric machine as claimed in claim 2, wherein the spraying means include a spray nozzle.

4. The electric machine as claimed in claim 1, wherein the circuit comprises a non-return valve disposed on an output duct.

5. The electric machine as claimed in claim 1, wherein the device comprises a fluidic level equalizing duct fluidically connected with the first peripheral compartment and with the second peripheral compartment, the equalizing duct comprising a nozzle and a ball disposed in the nozzle.

6. The electric machine as claimed in claim 1, wherein the device further comprises a means for managing the temperature of a hydraulic fluid contained in the tank, the management means being configured to drive a supply of the stator of the electric machine.

7. The electric machine as claimed in claim 1, wherein the first sealing means include a bead or a seal.

8. The electric machine as claimed in claim 1, wherein the second sealing means include a bead or a seal.

* * * * *